(12) United States Patent
Zusman

(10) Patent No.: US 7,171,313 B2
(45) Date of Patent: Jan. 30, 2007

(54) PROTECTION APPARATUS FOR RECIPROCATING MACHINE

(76) Inventor: George Zusman, 12931 Kingsbridge, Houston, TX (US) 77077

( * ) Notice: Subject to any disclaimer, the term of this patent is extended or adjusted under 35 U.S.C. 154(b) by 0 days.

(21) Appl. No.: 11/332,562

(22) Filed: Jan. 13, 2006

(65) Prior Publication Data
US 2006/0206274 A1   Sep. 14, 2006

Related U.S. Application Data

(60) Provisional application No. 60/660,184, filed on Mar. 10, 2005.

(51) Int. Cl.
*G01B 3/00* (2006.01)
(52) U.S. Cl. ........................ 702/33
(58) Field of Classification Search .................. 702/33
See application file for complete search history.

(56) References Cited

U.S. PATENT DOCUMENTS 6,499,350 B1 * 12/2002 Board et al. .................. 73/660
6,588,279 B2    7/2003 Zusman et al.
6,646,561 B1 * 11/2003 Zur et al. .............. 340/636.12
2004/0051993 A1 *  3/2004 Shin ............................ 360/75

* cited by examiner

*Primary Examiner*—John Barlow
*Assistant Examiner*—Demetrius Pretlow
(74) *Attorney, Agent, or Firm*—Clarence E. Eriksen

(57) ABSTRACT

Apparatus is disclosed for sensing impact events in reciprocating machinery. The apparatus establishes first and second reference or threshold voltages, where the second reference voltage is greater than the first reference voltage. The number of impact events ($N_1$) in a time window that exceed the first reference voltage and the number of impact events ($N_2$) in a time window that exceed the second reference voltage are counted and an output current is generated representative of the number of such impact events. If no impact greater than the lower threshold voltage is received during a given time window, the apparatus detects and stores a peak voltage corresponding to the impact having the greatest magnitude received during that time window. Apparatus according to the present invention produces an output current based on the magnitude of that peak voltage.

2 Claims, 3 Drawing Sheets

PROTECTION APPARATUS FOR RECIPROCATING MACHINE

CROSS-REFERENCE TO RELATED APPLICATION

This application claims the benefit of the filing date of U.S. Provisional Application 60/660,184, filed Mar. 10, 2005.

BACKGROUND OF THE INVENTION

1. Field of the Invention

The present invention relates to an impact transmitting device which is used in impact monitoring operations. More particularly, the present invention relates to an apparatus or detecting and reporting mechanical impacts in reciprocating machines.

2. Description of the Prior Art

The principle of operation of an impact transmitting device for reciprocating machines is to detect free vibrations which are typically symptomatic of machine failure and to transmit the free vibration measurements in the form of an electrical signal. This electrical signal is received by an external logic solver which determines whether or not the reciprocating machine should be powered down. In practice, an impact transmitting device saves unnecessary waste caused by speculative preventative maintenance and increases the life-cycle of reciprocating machine components by alerting operators to early-stage development of harmful mechanical conditions. Such conditions may include loose rod nuts, loose bolts, excessive slipper clearance, worn pins, broken parts, liquid in the process, and rubbing.

In operation, an impact transmitting device is mounted to a reciprocating machine such as a reciprocating compressor having a compressor cylinder assembly. The impact transmitting device detects mechanical impact events in or near the compressor cylinder assembly. The amplitude of each detected impact event is compared to a preset threshold level. If the amplitude of the impact event surpasses the threshold, then the impact event is counted as an "above-threshold impact event." The number of above-threshold impact events that are counted by the impact transmitting device during a preset time window interval is reported to an external logic solver such as a programmable logic controller ("PLC") or distributed control system ("DCS"). The external logic solver compares the signal to a predetermined level of acceptable above-threshold impact events during the given time window. If the number of above-threshold level impact events is below the preset acceptable level, then the impact events are disregarded as a "nuisance alarm." However, if the number is at or above the acceptable level, then the machine is experiencing harmful mechanical events and must be shut down for appropriate maintenance.

While prior art impact transmitting devices offer the ability to detect and report useful mechanical impact data, it has been observed that these devices have at least two deficiencies. First, prior art impact transmitting devices are actually stand-alone rack mounted monitoring systems. As a result, prior art impact transmitting devices are expensive and cumbersome. Second, many prior art impact transmitting devices do not provide for manipulation of the impact threshold level or the time window interval during which the above-threshold impact events are counted. Moreover, the impact transmitter devices that do allow these parameters to be manipulated must be adjusted by using software prior to installation of the device or by an experienced technical person.

In U.S. Pat. No. 6,588,279, an impact transmitting device is disclosed that functions as a single self-contained unit and has an impact transmitting device having a simple "field" adjustable impact threshold level for detecting above-threshold level impact events. The device described in the '279 patent also has a simple field adjustable time window interval during which these above-threshold level impact events are counted.

While the impact transmitting device described in the '279 patent constitutes an advance in the art, it only generates information concerning events which produce a voltage above a preselected threshold voltage. Data respecting lower level impacts in conjunction with data representing higher level impacts is believed by applicant to provide more comprehensive information about the status of a reciprocating machine, and the apparatus in accordance with the present invention provides such data.

SUMMARY OF THE INVENTION

In accordance with the present invention, protection apparatus for a reciprocating machine is provided. The apparatus resides in a housing which is appropriately connected to the reciprocating machine being monitored. The housing comprises a connector to which one end of a cable may be coupled to permit communication between the protection apparatus in the housing and an external computer coupled to the other end of the cable.

Apparatus in accordance with the present invention functions to detect impacts that occur during a time window having a predetermined duration. Information specifying the duration of the time window is communicated from the external computer to a central processing unit, e.g. a microprocessor, located in the protection apparatus. The central processing unit utilizes that information to generate a periodic time window signal, TW.

The apparatus utilizes two threshold voltages $V_{ref1}$ and $V_{ref2}$, and information respecting the magnitude of these threshold voltages is also communicated from the external computer to the protection apparatus during initialization. The central processing unit utilizes this information to establish two reference voltage sources.

In the event that no impacts greater than the lower threshold voltage ($V_{ref1}$) are received during a given time window, the apparatus detects and stores a voltage corresponding to the impact having the highest magnitude that is received during that time window. This detection may advantageously be effected using a peak detector whose output voltage, $V_{peak}$, is digitized and then inputted into a microprocessor. At the end of the time window, apparatus in accordance with the present invention generates an output current $I_{OUT}$ in accordance with the following formula:

$$I_{OUT} = V_{peak}/V_{ref1} \times (I_L - 4\ ma) + 4\ ma$$

where $I_L$ is a current which is >4 ma and <20 ma. The external computer also communicates the value for $I_L$ to the central processing unit in the protection apparatus during initialization. In one embodiment, $I_L = 10$ ma.

In the event that impacts are received during a given time window that exceed either or both the threshold voltages, the number of impacts exceeding the lower threshold voltage and the number of impacts exceeding the upper threshold voltage during that time window are counted. At the end of the time window, apparatus in accordance with the present invention generates an output current $I_{OUT}$ according to the following formula:

$$I_{OUT}=\alpha_1 N_1+\alpha_2 N_2+I_L$$

where $N_1$=the number of impacts in the time window>$V_{ref1}$
$N_2$=the number of impacts in the time window>$V_{ref2}$
$\alpha_1$ and $\alpha_2$ are incremental currents, the values of which were communicated from the external computer to the central processing unit during initialization. In one embodiment, $\alpha_1$ and $\alpha_2$ are each 0.5 ma.

DESCRIPTION OF SPECIFIC EMBODIMENTS

It will be appreciated that the present invention may take may forms and embodiments. Some embodiments of the invention will be described so as to give an understanding of the invention. The embodiments that are described are not intended to limit the invention but rather to illustrate it.

Figure 1:
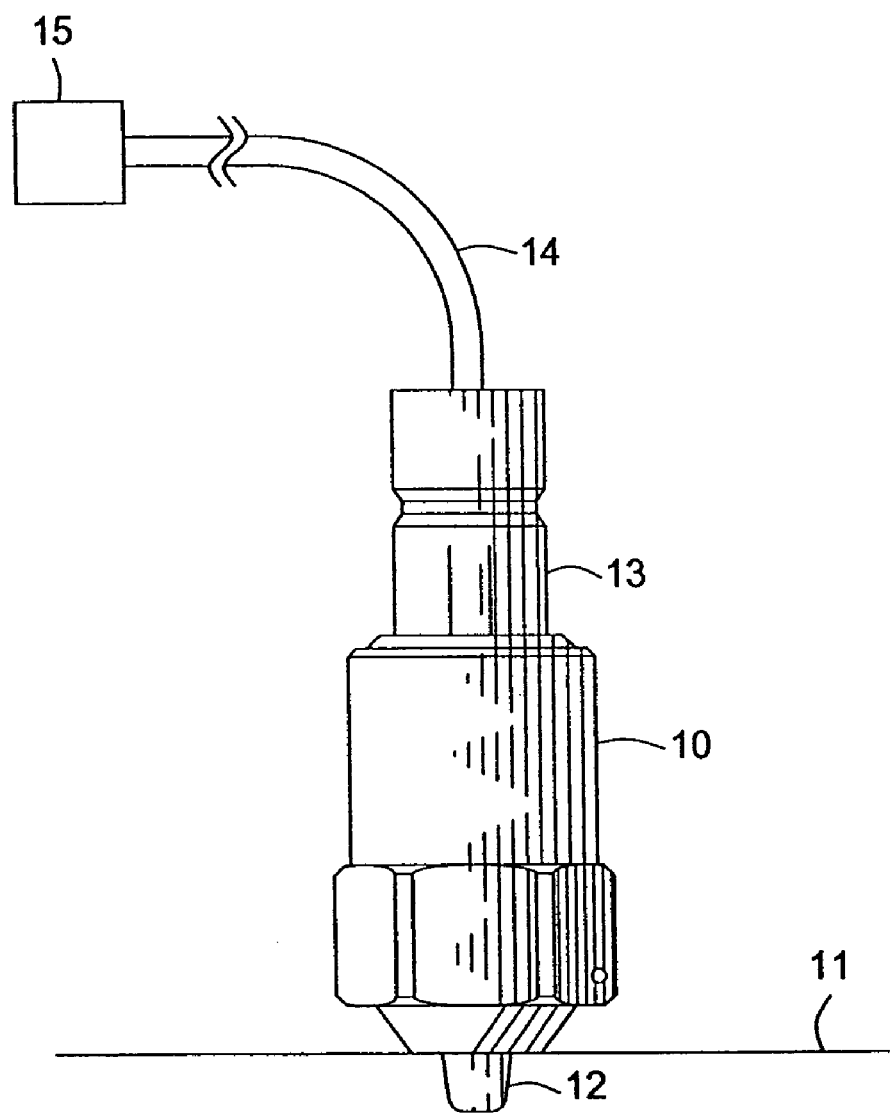
FIG. 1 is a schematic drawing illustrating a system in which protection apparatus in accordance with the present invention may be used.

Referring first to FIG. 1, protection apparatus in accordance with the present invention resides in a housing 10 which is attached to reciprocating machinery 11. Such attachment may, for example, be effected by use of a threaded connection between adapter 12 and reciprocating machine 11. The housing 10 includes a connector 13 to which one end of cable 14 is coupled. The other end of cable 14 is connected to external computer 15.

Figure 2:
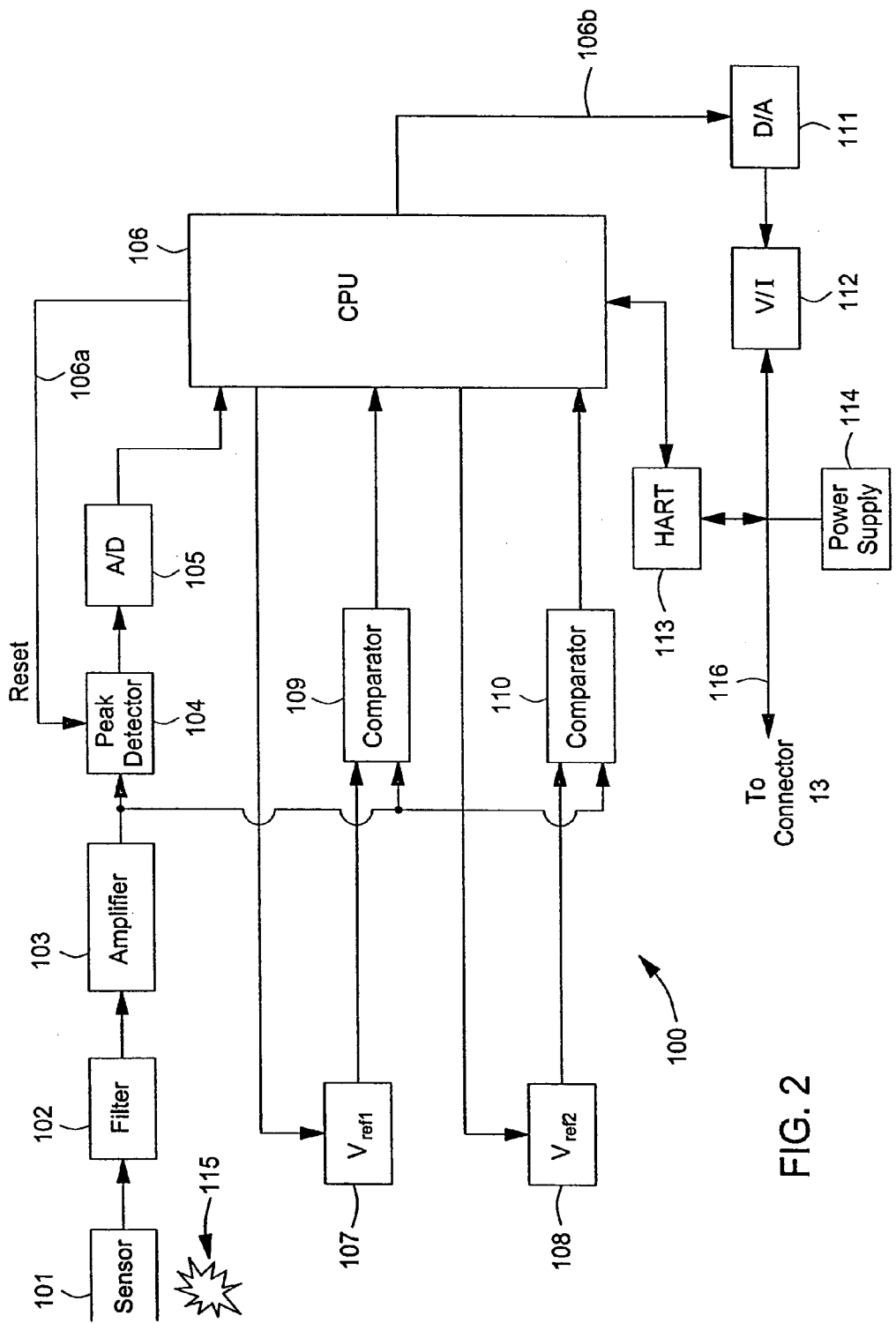
FIG. 2 is a schematic diagram in block diagram form illustrating one embodiment of protection apparatus in accordance with the present invention.

With reference now to FIG. 2, an impact transmitter device in accordance with the present invention comprises electrical assembly 100. The electrical assembly 100 includes a sensor 101 which functions in response to an impact 115 to produce a voltage at its output. Sensor 101 may, for example, be an accelerometer.

The output of sensor 101 is fed into a filter 102 which is preferably a bandpass filter which may, for example, pass signals having frequencies in the band between 500 Hz. and 10,000 Hz. The output of bandpass filter 102 is coupled to the input of amplifier 103, which amplifies the signal generated by sensor 101 as filtered by bandpass filter 102. The output of amplifier 103 is coupled to peak detector 104.

Apparatus in accordance with the present invention includes a central processing unit ("CPU") 106 which in one embodiment is a PIC 64 microprocessor which is available from Microchip Corp. One function of CPU 106 is to generate a time window signal $T_W$ of a predetermined duration. The duration of $T_W$ is a parameter which the external computer 15 provides to CPU 106 via cable 14 and HART generator 113 during initialization. Normally, the duration of $T_W$ is equal to the time required for 12–20 reciprocations of the reciprocating machine shaft to occur and the duration of $T_W$ may be between 0.5 and 4 seconds.

Figure 5:
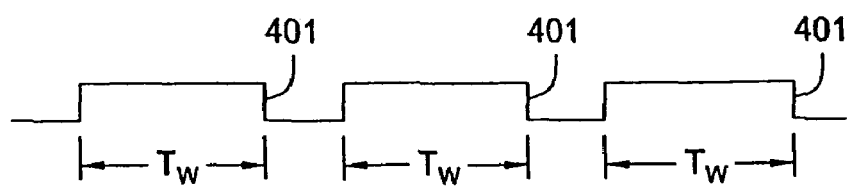
FIG. 5 is a timing diagram which illustrates a periodic time window being generated by microprocessor 106 in FIG. 1.

With reference to FIGS. 2 and 5, CPU 106 generates the periodic signal $T_W$ at one of its outputs 106A which is coupled to the reset input of peak detector 104. During the active state of $T_W$, peak detector 104 is enabled. Peak detector 104 is reset on the trailing edge 401 of the active state of the signal $T_W$.

Apparatus in accordance with the present invention comprises two threshold voltages, $V_{ref1}$ and $V_{ref2}$, where $V_{ref2}$ is greater in magnitude than $V_{ref1}$. The values of $V_{ref1}$ and $V_{ref2}$ are communicated from external computer 15 to CPU 106 via cable 14 and HART generator 113. Voltage sources 107 and 108, which are controlled by CPU 106, provide voltages at their outputs equal to $V_{ref1}$ and $V_{ref2}$, respectively. Voltage sources 107 and 108 may, for example, comprise programmable resistors.

Figure 3:
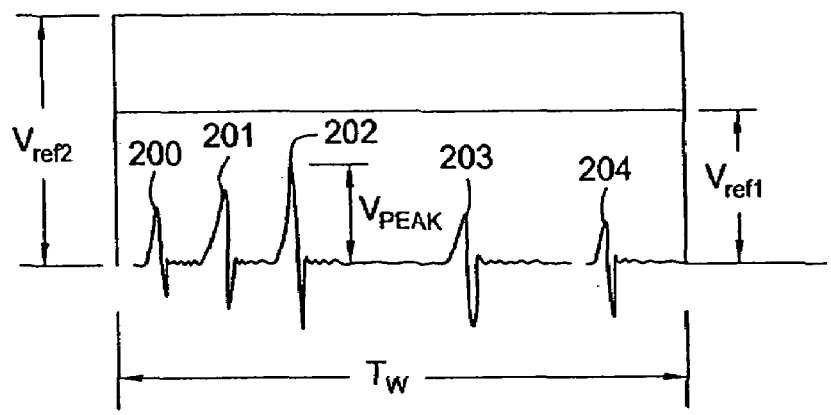
FIG. 3 is a timing diagram which illustrates one aspect of the operation of apparatus in accordance with the present invention.

In certain instances, there may be no impacts greater than the lower threshold voltage $V_{ref1}$ which are received during a given time window $T_W$. Such an instance is illustrated in FIG. 3, where each of the impact events 200–204 is less than the first reference threshold voltage $V_{ref1}$. In this instance, the peak detector 104 functions to detect the impact event during the time window having the highest voltage i.e. $V_{peak}$, which in FIG. 3 is the impact event 202. Analog-to-digital converter, which is preferably a 12-bit device, digitizes the value of $V_{peak}$ and provides that value to CPU 106. At the conclusion of the time window in the situation illustrated in FIG. 3, the apparatus of FIG. 2 causes an output current $I_{OUT}$ to appear at output node 116 according to the formula:

$$I_{OUT}=V_{peak}/V_{ref1}\times(I_L-4\ ma)+4\ ma,$$

where $I_L$ has a value >4 ma and <20 ma and where the value of $I_L$ is provided to CPU 106 via cable 13 and HART generator 113. In one embodiment, $I_L$=10 ma.

The voltage generated by CPU 106 to cause that valve of $I_{OUT}$ to appear at output 116 is fed to digital-to-analog converter (DAC) 111, which is preferably a 12-bit device, and the output of DAC111 is coupled to the input of voltage to current converter 112. Voltage to current converter 112 converts the output voltage of DAC 111 to an analog signal.

Figure 4:
FIG. 4 is a timing diagram which illustrates a second aspect of the operation of apparatus in accordance with the present invention.

In accordance with another aspect of the present invention, impact events may be received during the time window which exceed only the lower threshold voltage $V_{ref1}$ or which exceed both the lower threshold voltage Vref1 and the upper threshold voltage $V_{ref2}$. The latter situation is illustrated in FIG. 4 where two impact events 301 and 302 are shown that exceed the lower threshold voltage $V_{ref1}$ and two impact events 303 and 304 illustrated which exceed the higher threshold voltage $V_{ref2}$.

The output of amplifier 103 is connected to one input of comparator 109 and one input of comparator 110. The second input of comparator 109 is connected to the output of voltage source 107 which produces the first threshold voltage $V_{ref1}$. The second input to comparator 110 is connected to the output of voltage source 108 which produces the second threshold voltage $V_{ref2}$.

Apparatus in accordance with the present invention counts the number of impact events that exceed the first threshold voltage $V_{ref1}$ during a given time window and the number of impact events that exceed the second threshold voltage $V_{ref2}$ during that time window. In the situation illustrated in FIG. 4, the output of comparator 109 is a logic one for each of the impact events 301–304 in the time window illustrated. The output of comparator 110 is a logic one for the impact events 303 and 304. At the conclusion of the time window for the situation illustrated in FIG. 4, the apparatus of FIG. 2 causes an output current $I_{OUT}$ to appear at output node 116 according to the formula $$I_{OUT} = \alpha_1 N_1 + \alpha_2 N_2 + I_L$$

where $N_1$=the number of impacts in a time window that are greater than $V_{ref1}$;

$N_2$=the number of impacts in a time window that are greater than $V_{ref2}$;

$\alpha_1$ and $\alpha_2$ are incremental current values, which may, for example, be 0.5 ma each; and and $I_L$=10 ma.

In the situation illustrated in FIG. 4, $N_1$=4 and $N_2$=2.

Power for apparatus in accordance with the present invention may be supplied by power supply 114 which in one embodiment receives an input voltage of 24 volts and which has an output voltage of 5 volts to power the various components in the apparatus.

By using protection apparatus in accordance with the present invention, impact events are detected which are lower in magnitude than events detected by prior art protection equipment. These lower magnitude events provide extremely useful information respecting the onset of malfunctions in reciprocating machinery. With this information, potential problems may be detected and fixed before they become major problems.

What is claimed is:

1. An impact transmitter device for measuring impact events in a reciprocating machine and transmitting data respecting said impact events to an external computer, said impact transmitter device comprising:

a housing which is mounted to the reciprocating machine;

a connector attached to the housing for electrically connecting the impact transmitter device to the external computer;

an electrical assembly within the housing and connected to the connector for detecting impact events and transmitting information respecting said impact events to the external computer, said electrical assembly comprising:

a sensing device which produces an output voltage when a machine impact occurs;

a microprocessor: (i) which is initialized by signals sent to it from the external computer; (ii) which counts the number of times ($N_1$) that the output of the sensing device exceeds a first reference voltage and the number of times ($N_2$) that the output of the sensing device exceeds a second reference voltage during a time window, where the second reference voltage is greater in magnitude than the first reference voltage; and (iii) which produces a voltage from which an output current ($I_{OUT}$) is produced for communication to the external computer after the conclusion of a time window, said output current being defined by the formula:

$$I_{OUT} = \alpha_1 N_1 + \alpha_2 N_2 + I_L$$

where $\alpha_1$ and $\alpha_2$ are incremental current values, $I_L$, is a current value >4 ma and <20 ma, and $\alpha_1$, $\alpha_2$ and $I_L$ are communicated to the microprocessor from the external computer when the external computer is connected to the microprocessor.

2. The impact transmitter device of claim 1, wherein it further comprises a peak detector for detecting, during a time window, the highest magnitude output voltage of the sensing device ($V_{peak}$) that is no greater than the first reference voltage ($V_{ref1}$), and if no impact produces a voltage greater than the first reference voltage during that time window, the microprocessor produces a voltage from which $I_{OUT}$ is generated according to the formula:

$$I_{OUT} = V_{peak}/V_{ref1} \times (I_L - 4\ ma) + 4\ ma.$$

* * * * *